United States Patent
Lee et al.

(10) Patent No.: US 8,383,286 B2
(45) Date of Patent: Feb. 26, 2013

(54) METHOD FOR PREPARING METAL OXIDE SOL, METHOD FOR PREPARING METAL OXIDE THIN FILM USING SAID SOL, AND SOLID OXIDE FUEL CELL COMPRISING SAID THIN FILM

(75) Inventors: Hae-Weon Lee, Seoul (KR); Jong Ho Lee, Seoul (KR); Eun Oak Oh, Seoul (KR); Ji-Won Son, Seoul (KR); Hae-Ryoung Kim, Seoul (KR); Hyoungchul Kim, Seoul (KR); Kyung-ryul Lee, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 774 days.

(21) Appl. No.: 12/539,353

(22) Filed: Aug. 11, 2009

(65) Prior Publication Data
US 2010/0092832 A1   Apr. 15, 2010

(30) Foreign Application Priority Data

Oct. 14, 2008   (KR) .................. 10-2008-0100491

(51) Int. Cl.
   *H01M 8/10* (2006.01)
(52) U.S. Cl. ........ 429/486; 429/465; 429/472; 429/477; 429/479; 429/483; 429/484; 429/485; 429/487; 429/488; 429/489; 429/532; 429/535

(58) Field of Classification Search .................. 429/465, 429/472, 477, 479, 483–489, 532, 535
   See application file for complete search history.

(56) References Cited

U.S. PATENT DOCUMENTS

| | | | |
|---|---|---|---|
| 2005/0255239 A1* | 11/2005 | Zhu et al. | 427/226 |
| 2006/0057455 A1 | 3/2006 | Guntow et al. | |
| 2006/0163066 A1 | 7/2006 | Hilchenko et al. | |

FOREIGN PATENT DOCUMENTS

| | | |
|---|---|---|
| KR | 100618129 B1 | 8/2006 |
| KR | 100648144 B1 | 11/2006 |

OTHER PUBLICATIONS

International Search Report mailed Mar. 17, 2010; PCT/KR2009/004401.

* cited by examiner

*Primary Examiner* — Patrick Ryan
*Assistant Examiner* — Ben Lewis
(74) *Attorney, Agent, or Firm* — Ladas & Parry LLP

(57) ABSTRACT

A metal oxide thin film structure for a solid oxide fuel cell, prepared by a method comprising dispersing a metal oxide nanopowder in a metal oxide salt solution and subsequent coating of the resulting metal oxide powder dispersed sol and the metal oxide salt solution on a porous substrate, has excellent gas impermeability, excellent phase stability, and is devoid of cracks or pinholes.

13 Claims, 14 Drawing Sheets

METHOD FOR PREPARING METAL OXIDE SOL, METHOD FOR PREPARING METAL OXIDE THIN FILM USING SAID SOL, AND SOLID OXIDE FUEL CELL COMPRISING SAID THIN FILM

CROSS REFERENCE TO RELATED APPLICATION

This application claims priority based on Korean Patent Application No. 10-2008-0100491, filed Oct. 14, 2008, the content of which is incorporated herein by reference in its entirety.

FIELD OF THE INVENTION

The present invention relates to a method for manufacturing a metal oxide thin film structure using a sol-gel process, and to a solid oxide fuel cell (SOFC) comprising the metal oxide thin film.

BACKGROUND OF THE INVENTION

A solid oxide fuel cell (SOFC) comprises an air electrode (cathode), a fuel electrode (anode) and an electrolyte, wherein the electrolyte is the most important component which influences the performance of the SOFC.

The electrolyte used in an SOFC is sintered at a high temperature of 1000 to 1400° C. so as to form a dense microstructure that prevents the mixing of oxygen and fuel. An SOFC is generally operated at a high temperature of 800° C. or more to maintain the oxygen ion conductivity at a high level. For this reason, there exists the problem that the materials for SOFC components are limited because of high production costs and gradual performance degradation under such a high temperature condition.

Recently, there have been developed SOFCs which can be operated at a temperature lower than 800° C. For such SOFCs, it is required to develop an electrolyte system which exhibits excellent phase stability and structural stability at 500 to 800° C. as well as a satisfactorily good oxygen ion conductivity. In order to develop such an electrolyte, novel electrolyte materials having high ion conductivity at said temperature range have been developed. On the other hand, efforts to decrease the resistance of conventional electrolyte materials, e.g. yttria-stabilized zirconia (YSZ), have been intensively attempted by making them in the form of a thin film.

In order to decrease the operation temperature of an SOFC by using a thin film form of an electrolyte, there have been conducted various studies to prepare a ceramic thin film suitable for use as an electrolyte for an SOFC by a gas-phase process such as sputtering and ion plating (see Japanese Patent Publication Nos. 2000-62077, 2000-329729 and 2004-87490.) However, such gas-phase processes are problematic in that the use of high-cost equipments and starting materials is required, the shape and size of the substrate are limited, the formation of a film is slow, and it is difficult to form a pinhole-free film.

When an electrolyte thin film is formed by a conventional powder-based process, a micron-size starting powder is used, and, when it is sintered at a high temperature of 1200° C. or more, a film composed of micron-size particles is obtained. However, when the thickness of the electrolyte thin film is smaller than the particle size of the powder, the electrolyte thin film disintegrates during grain growth, which makes it difficult to form a dense thin film.

Therefore, there has been a need to develop a cost-effective method of preparing an electrolyte thin film for SOFCs, which can maintain a stable phase, a durable structure, and satisfactory density to prevent gas permeation therethrough during the operation thereof at a temperature lower than 800° C.

SUMMARY OF THE INVENTION

Accordingly, it is an object of the present invention to provide a method for preparing a metal oxide thin film on a porous substrate, using a sol-gel process by which a microstructure that is stable at a low-temperature process can be easily prepared.

It is another object of the present invention to provide a metal oxide thin film for an SOFC which is stable in terms of the phase and structure, which is dense enough to prevent the reaction gases from direct contacts.

In accordance with an aspect of the present invention, there is provided a method for preparing a metal oxide powder dispersed sol, comprising the steps of: (1) preparing a metal oxide salt solution containing a first metal oxide selected from the group consisting of zirconium oxide, cerium oxide, lanthanum gallate, barium cerate, barium zirconate, bismuth oxide, and doped forms thereof; and (2) dispersing a nanopowder of a second metal oxide selected from the group consisting of zirconium oxide, cerium oxide, lanthanum gallate, barium cerate, barium zirconate, bismuth oxide, and doped forms thereof, in said metal oxide salt solution.

In accordance with another aspect of the present invention, there is provided a method for manufacturing a metal oxide thin film structure, comprising the steps of: (1) preparing a metal oxide salt solution containing a first metal oxide selected from the group consisting of zirconium oxide, cerium oxide, lanthanum gallate, barium cerate, barium zirconate, bismuth oxide, and doped forms thereof; (2) dispersing a nanopowder of a second metal oxide selected from the group consisting of zirconium oxide, cerium oxide, lanthanum gallate, barium cerate, barium zirconate, bismuth oxide, and doped forms thereof, in the metal oxide salt solution, to prepare a metal oxide powder dispersed sol; (3) coating a porous substrate with the metal oxide powder dispersed sol; (4) coating the resulting substrate with the metal oxide salt solution prepared in step (1); and (5) sintering the resulting substrate to prepare a metal oxide thin film structure.

In accordance with a further aspect of the present invention, there is provided a metal oxide thin film structure manufactured by the inventive method.

In accordance with a still further aspect of the present invention, there is provided a solid oxide fuel cell comprising the inventive metal oxide thin film structure.

According to the present invention, when a metal oxide thin film is formed on a porous substrate using a sol-gel process, the resulting microstructure can be easily controlled without using high-cost equipments and starting materials, the shape and size of the substrate does not become a limiting factor, and a phase that is stable at a low SOFC operating temperature can be easily acquired. The metal oxide film formed in this way is dense to such a degree that it is impermeable to gases, is resistant to the generation of cracks or pinholes, and exhibits a low electrical resistance because of its thin structure, and it is stable and durable when used in a low-temperature SOFC process. Therefore, the inventive metal oxide film can be beneficially used as an electrolyte for a fuel cell or an oxygen sensor, and it can also be applied to thermal barrier coating, optical materials, high-temperature superconductive thin buffer layers, insulation films in the fields of electronic devices, and others.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE INVENTION

Figure 1:
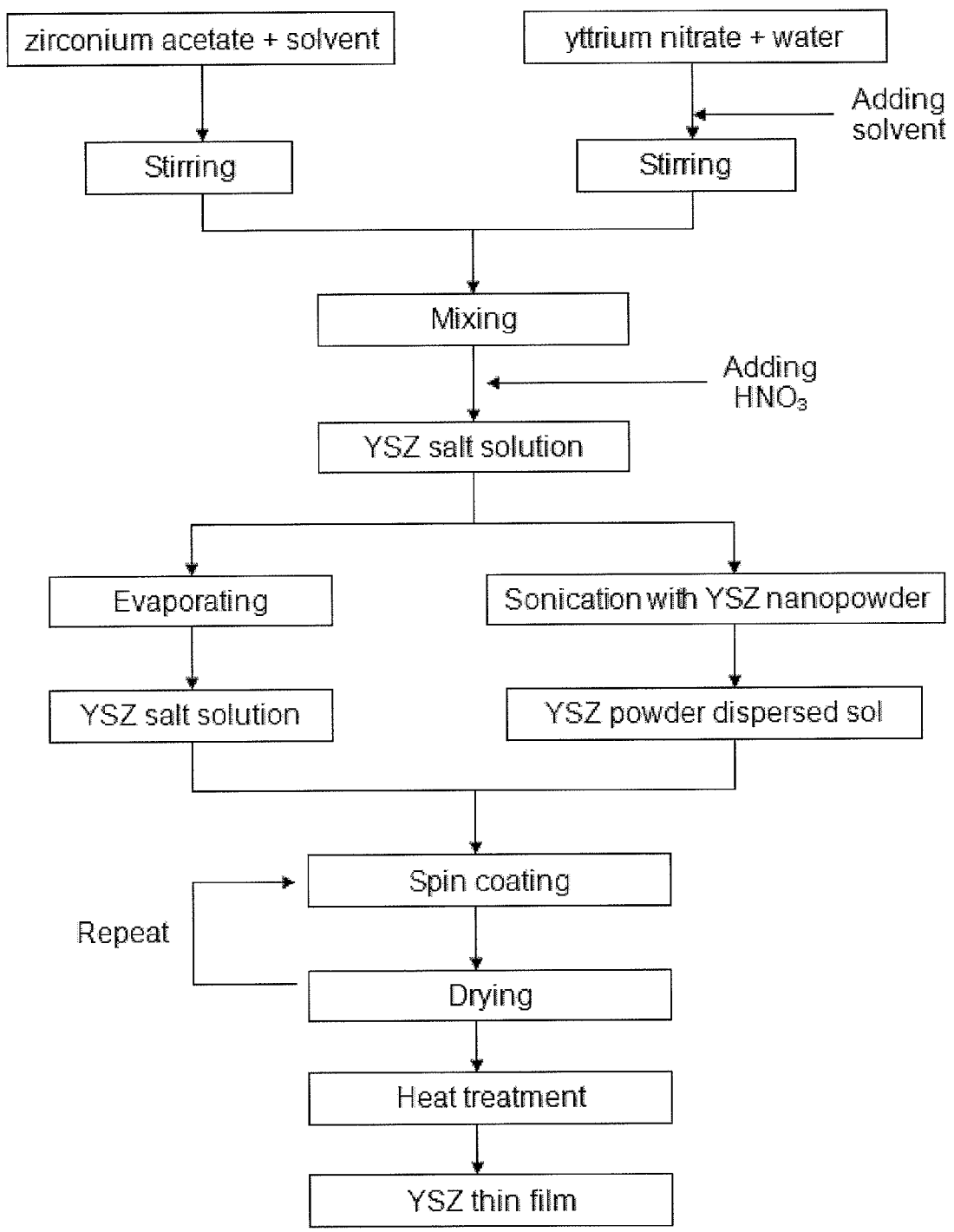
FIG. 1: a schematic flowchart of the method for preparing the YSZ thin film of Example 1.

The present invention provides a method for preparing a metal oxide powder dispersed sol, comprising the steps of: (1) preparing a metal oxide salt solution containing a first metal oxide selected from the group consisting of zirconium oxide, cerium oxide, lanthanum gallate, barium cerate, barium zirconate, bismuth oxide, and doped forms thereof; and (2) dispersing a nanopowder of a second metal oxide selected from the group consisting of zirconium oxide, cerium oxide, lanthanum gallate, barium cerate, barium zirconate, bismuth oxide, and doped forms thereof, in said metal oxide salt solution.

In the inventive method, the first and second metal oxides may be each selected from the group consisting of samaria-doped ceria (SDC), gadolia-doped ceria (GDC), yttria-stabilized zirconia (YSZ), scandia-stabilized zirconia (ScSZ), strontium manganese-doped lanthanum gallate (LSGM) and silver yttria-doped bismuth oxide (YDB), preferably YSZ. However, the present invention is not limited thereto, and may also be selected from another ion conducting materials such as an oxygen ion conducting material and a proton conducting material.

The metal oxide salt solution may be prepared by dispersing or mixing metal oxides selected from the group consisting of zirconium oxide, cerium oxide, lanthanum gallate, barium cerate, barium zirconate, bismuth oxide and doped phases thereof, in an aqueous or organic solvent. For example, the YSZ salt solution may be obtained by mixing a chelating agent (for example, acetyl acetonate or acetic acid), a catalyst and a drying adjuster with a nitrate or acetate based yttrium precursor and a zirconium precursor to form a mixture and then dissolving and stirring the mixture in an aqueous or organic solvent.

The second metal oxide nanopowder may be a nanopowder of a metal oxide the same as the first metal oxide which is used in the metal oxide salt solution. However, it may also be a nanopowder of a metal oxide different from the first metal oxide. When using the different metal oxide, it may be required that the metal oxide does not react with the metal oxide salt solution, has good physical properties such as a good thermal expansion coefficient, and can be used as an electrolyte or an electrode material.

The second metal oxide nanopowder may have an average particle size of 1 to 990 nm, and may have a specific surface area of 10 to 900 $m^2/g$, preferably 10 to 200 $m^2/g$.

The second metal oxide nanopowder may be dispersed in the metal oxide salt solution in an amount of 1 to 50 wt % based on the total weight of the metal oxide powder dispersed sol.

Further, the present invention provides a method for manufacturing a metal oxide thin film structure, comprising the steps of: (1) preparing a metal oxide salt solution containing a first metal oxide selected from the group consisting of zirconium oxide, cerium oxide, lanthanum gallate, barium cerate, barium zirconate, bismuth oxide, and doped forms thereof; (2) dispersing a nanopowder of a second metal oxide selected from the group consisting of zirconium oxide, cerium oxide, lanthanum gallate, barium cerate, barium zirconate, bismuth oxide, and doped forms thereof, in the metal oxide salt solution, to prepare a metal oxide powder dispersed sol; (3) coating a porous substrate with the metal oxide powder dispersed sol; (4) treating the coated resulting substrate with the metal oxide salt solution obtained in step (1); and (5) sintering the resulting substrate to prepare a metal oxide thin film structure.

Unless otherwise stated, the description of the afore-mentioned method for preparing a metal oxide solution is also applied to the method for manufacturing a metal oxide thin film structure.

According to an embodiment of the present invention, two or more metal oxide powder dispersed sols having different contents may be prepared in step (2); and the porous substrate in step (3) may be coated therewith to various at different degrees.

For example, a uniform and dense metal oxide thin film can be formed on a porous substrate without cracks or pinholes by coating a metal oxide nanopowder on a porous substrate as following steps: (i) coating a YSZ powder dispersed sol comprising 20 wt % of a YSZ nanopowder on a porous substrate followed by drying; (ii) coating a YSZ powder dispersed sol comprising 10 wt % of a YSZ nanopowder thereto followed by drying; (iii) coating a YSZ powder dispersed sol comprising 5 wt % a YSZ nanopowder thereto followed by drying; and (iv) coating a YSZ salt solution comprising no YSZ nanopowder thereto followed by drying.

According to another embodiment of the present invention, two or more metal oxide salt solutions having different concentrations of the first metal oxide are prepared in step (1); and, in step (4), the substrate is coated with each of the metal oxide salt solutions to various degrees.

The metal oxide salt solutions having different concentrations can be prepared by concentrating the metal oxide salt solution through evaporation. The concentration of the metal oxide salt solution may be in a range of 0.01 to 10 mol/L, preferably 0.5 to 5 mol/L. The metal oxide salt solutions having different concentrations can be coated on the substrate to various degrees. For example, it may be coated by a method comprising the steps of: (i) coating the substrate with a metal oxide salt solution having higher concentration followed by drying, and (ii) coating the resulting substrate with a metal oxide salt solution having lower concentration followed by drying.

The first and second metal oxides may be each selected from the group consisting of SDC, GDC, YSZ, ScSZ, LSGM, YDB, preferably YSZ.

The metal oxide nanopowder serves to fill the cracks or micro-pinholes present in a porous substrate and to decrease the difference in constriction rate between the metal oxide powder dispersed sol and the porous substrate. The second metal oxide nanopowder may have an average particle size of 1 to 990 nm, and may have a specific surface area of 10 to 900 $m^2/g$, preferably 10 to 200 $m^2/g$.

The second metal oxide nanopowder may be dispersed in the metal oxide salt solution in an amount of 1 to 50 wt % based on the total weight of the metal oxide powder dispersed sol.

In steps (3) and (4), the coating may be conducted by a method selected from the group consisting of spin coating, dipping, spray pyrolysis, electro-static spray deposition (ESD) and a combination thereof. The drying of the coated porous substrate may be conducted at a temperature of 100 to 400° C.

The step (3) or (4) may be repeated more than once in order to adjust a thickness of the resulting film, while considering the quality of a substrate, the concentration of a solution and the amount of a nanopowder. Preferably, each of the steps (3) and (4) may be conducted 2 to 4 times.

The resulting film may be sintered at a temperature of 600° C. or higher, is preferably sintered at 600 to 800° C. for 2 to 10 hours. The resulting metal oxide thin film may have a thickness of 0.1 to 30 μm.

The porous substrate used in the present invention is not limited, for example, it may be selected from a porous metal-ceramic composite (cermet) which used in conventional SOFC and provided with pores at the sites from which oxygen was removed, a porous ceramic insulator, a porous metal composite, a porous silicon composite using a cathode oxidation, and a porous alumina. The substrate material suitable for SOFC may be selected from the group consisting of metals such as nickel (Ni), ruthenium (Ru), palladium (Pd), rhodium (Rd), platinum (Pt) and the like, alloys thereof, composites (cermets) of the metals with YSZ and GDC, and ruthenium oxides. The porous substrate may be manufactured through a powder based process such as a pressure forming process, a tape casting process, etc.

The metal oxide thin film prepared by the inventive method is stable in the aspects of phase-formation and structure because it is formed through a low-temperature, does not cause the problems of pinholes because it is densely formed, and can be used as an electrolyte for an SOFC, thereby increasing the efficiency of an SOFC. The method for manufacturing a metal oxide thin film according to the present invention can be used to manufacture an electrolyte film for a solid oxide fuel cell (SOFC). The solid oxide fuel cell including the metal oxide thin film structure manufactured by the inventive method, can improve the performance of a fuel cell and reduce the production cost thereof. In the inventive solid oxide fuel cell, the porous substrate may serve as a fuel electrode (anode) or an air electrode (cathode).

EXAMPLES

The following examples are intended to illustrate the present invention, however these examples are not to be construed to limit the scope of the invention.

Example 1

Preparation of YSZ Thin Film Structure (1)

A YSZ thin film structure was prepared by following procedures, which are schematically shown in FIG. 1.

1-1. Preparation of YSZ Powder Dispersed Sol and YSZ Salt Solution a) Ethanol as a solvent, DMF ($C_3H_7NO$) as a solvent and drying adjuster, and acetylacetonate ($C_5H_8O_2$) as a chelating agent were mixed at a volume ratio of 30:40:30(%), and then stirred at room temperature for 30 min to form a dispersion solution.

b) 82.6 g of the dispersion solution was added to 53.21 g of zirconium acetate in dilute acetic acid, then stirred for 1 hour, thus obtaining a first salt solution. Another 82.6 g of the dispersion solution was added to 16.5 g of yttrium nitrate hexahydrate ($Y(NO_3)_3 \cdot 6H_2O$), then stirred for 30 min, thus obtaining a second salt solution. The first and the second salt solutions were mixed together and stirred at room temperature for 2 hours, then nitric acid ($HNO_3$) as a catalyst was added to obtain a YSZ salt solution (about pH 2.5)

c) YSZ nanopowders (particle size: 20-30 nm, specific surface area: 160 $m^2/g$, available from fuelcellmaterials.com) were dispersed in the YSZ salt solutions obtained in step b) in concentrations of 15, 10, 5 and 2.5 wt %, respectively, and then irradiated with ultrasonic waves (60% power), so as to obtain YSZ powder dispersed sols having concentrations of 15, 10, 5 and 2.5 wt %, respectively.

d) Meanwhile, a YSZ salt solution prepared in the same manner as in step b) was evaporated at 80° C. to prepare a YSZ salt solutions having concentrations of 2 mol/L and 1 mol/L, respectively.

1-2. Preparation of YSZ Thin Film Structure 8 wt % of di-n-butyl phthalate (DBP) as a binder and 1.3 wt % of KD-1 (Hypermer, Netherland) as a dispersant were added to NiO—YSZ powder (TOSOH Corporation), and then ball-milled at room temperature for one day to obtain a slurry. Then, the slurry passed through a tape caster (manufactured by Korea Advanced Institute of Science and Technology) to obtain a NiO—YSZ substrate having a thickness of 0.4 mm. The obtained NiO—YSZ substrate was spin-coated with the YSZ powder dispersed sols and YSZ salt solution obtained in step 1-1 as following steps:

i) spin-coating with the 10 wt % YSZ powder dispersed sol;
ii) spin-coating with the 5 wt % YSZ powder dispersed sol; and
iii) spin-coating with the YSZ salt solution (2 mol/L).

The each step of spin-coating was conducted at a rate of 1000 to 4000 rpm for 40 seconds and the resulting substrate was dried at 300° C. in each step. In this case, the thickness of the YSZ salt solution layer formed in step iii) was in a range of 50 to 400 nm.

The resulting spin-coated substrate was sintered at 800° C. for 4 hours, so as to obtain a structure in which a YSZ thin film having a thickness of 0.5 to 1 μm is formed on the NiO—YSZ substrate.

Figure 2A:
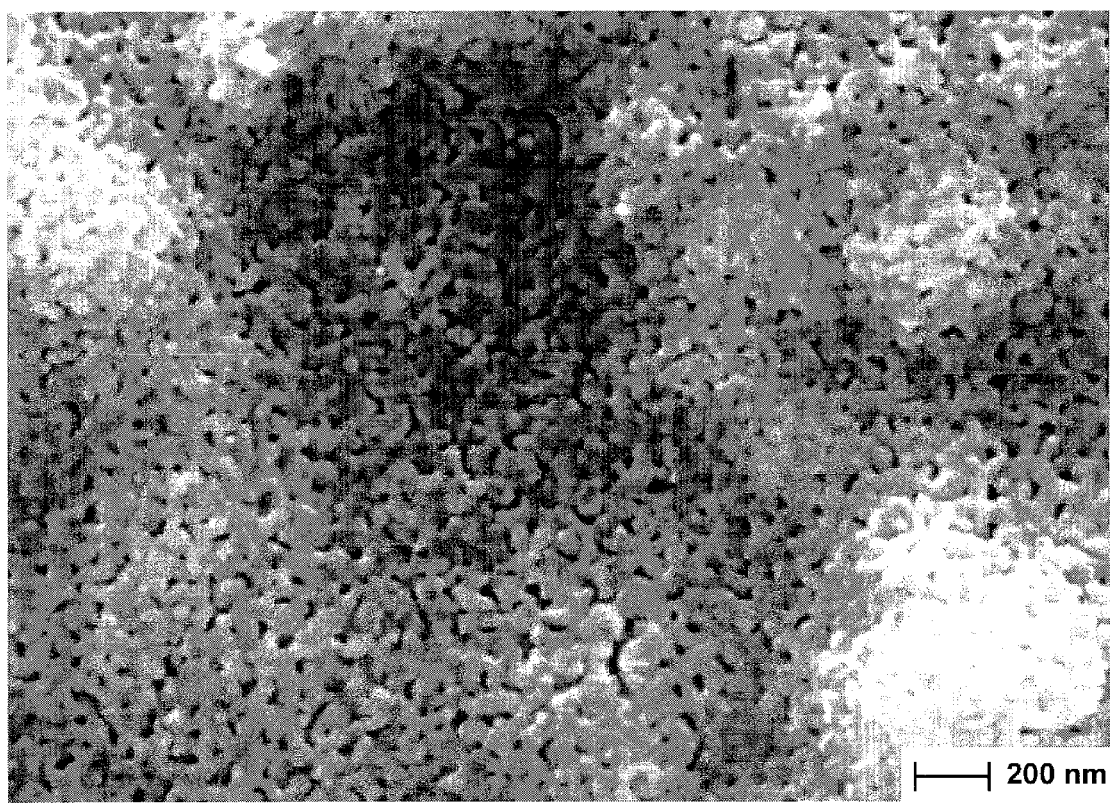
FIGS. 2A and 2B: scanning electron microscope (SEM) photographs of the surface and a section respectively of the YSZ thin film obtained by spin-coating with 15 wt % YSZ powder dispersed sol.
Figure 2B:
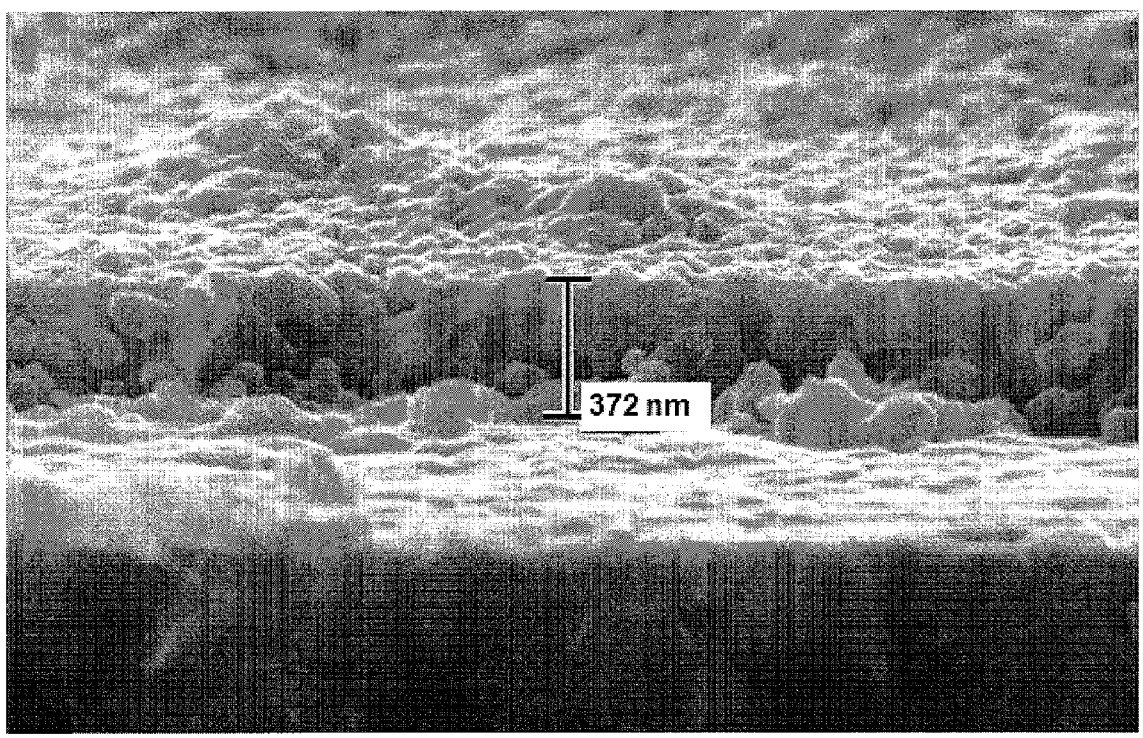

FIGS. 2A and 2B respectively show SEM photographs of the surface and a section of the YSZ thin film obtained by spin-coating once with the YSZ powder dispersed sol comprising 15 wt % of the nanopowder prepared in step 1-1 followed by sintering at 800° C. As shown in FIGS. 2A and 2B, the YSZ thin film is uniform and exhibits a density of about 90%.

Figure 3A:
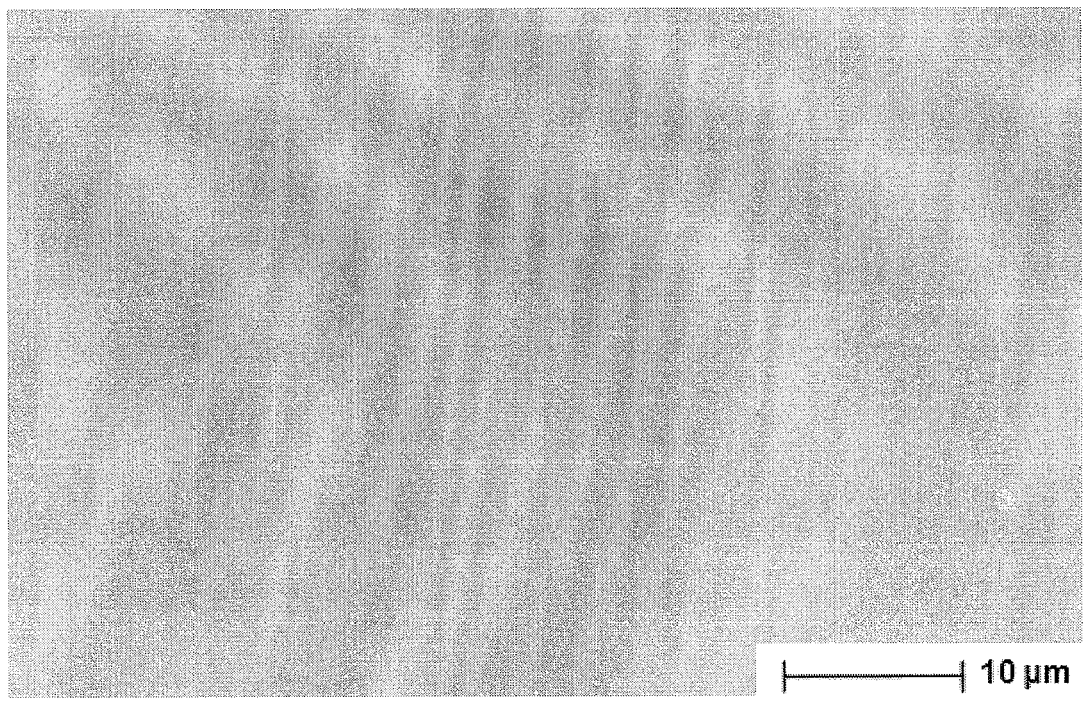
FIGS. 3A and 3B: SEM photographs of the surface and a section respectively of the YSZ thin film obtained in Example 1.
Figure 3A:
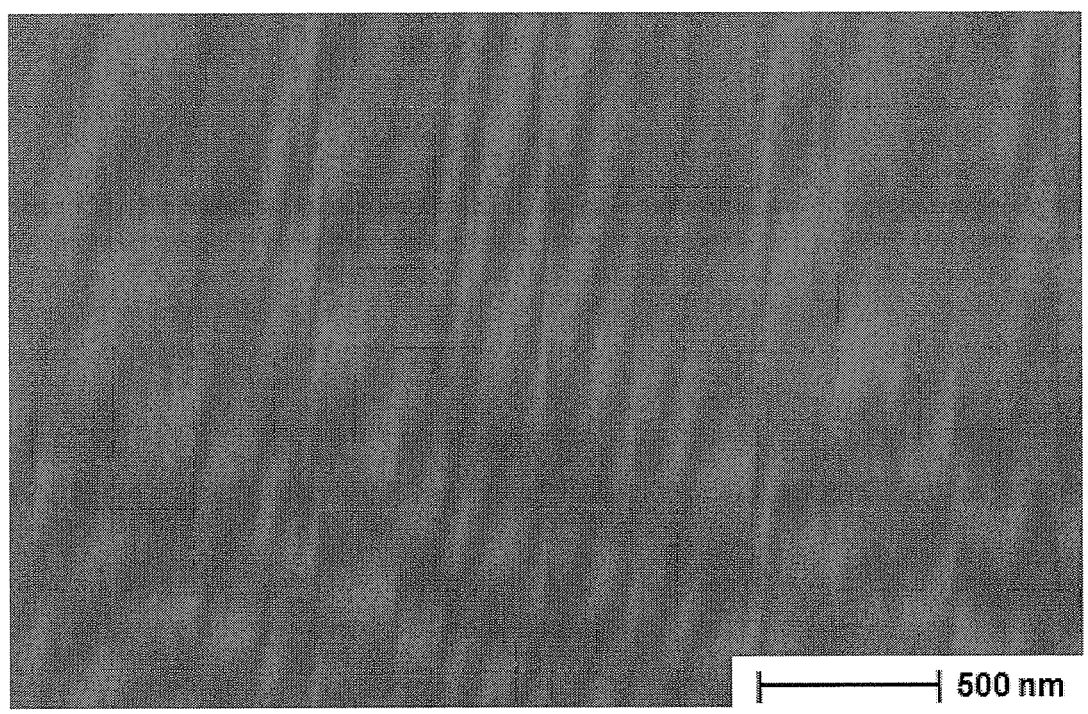
Figure 3B:
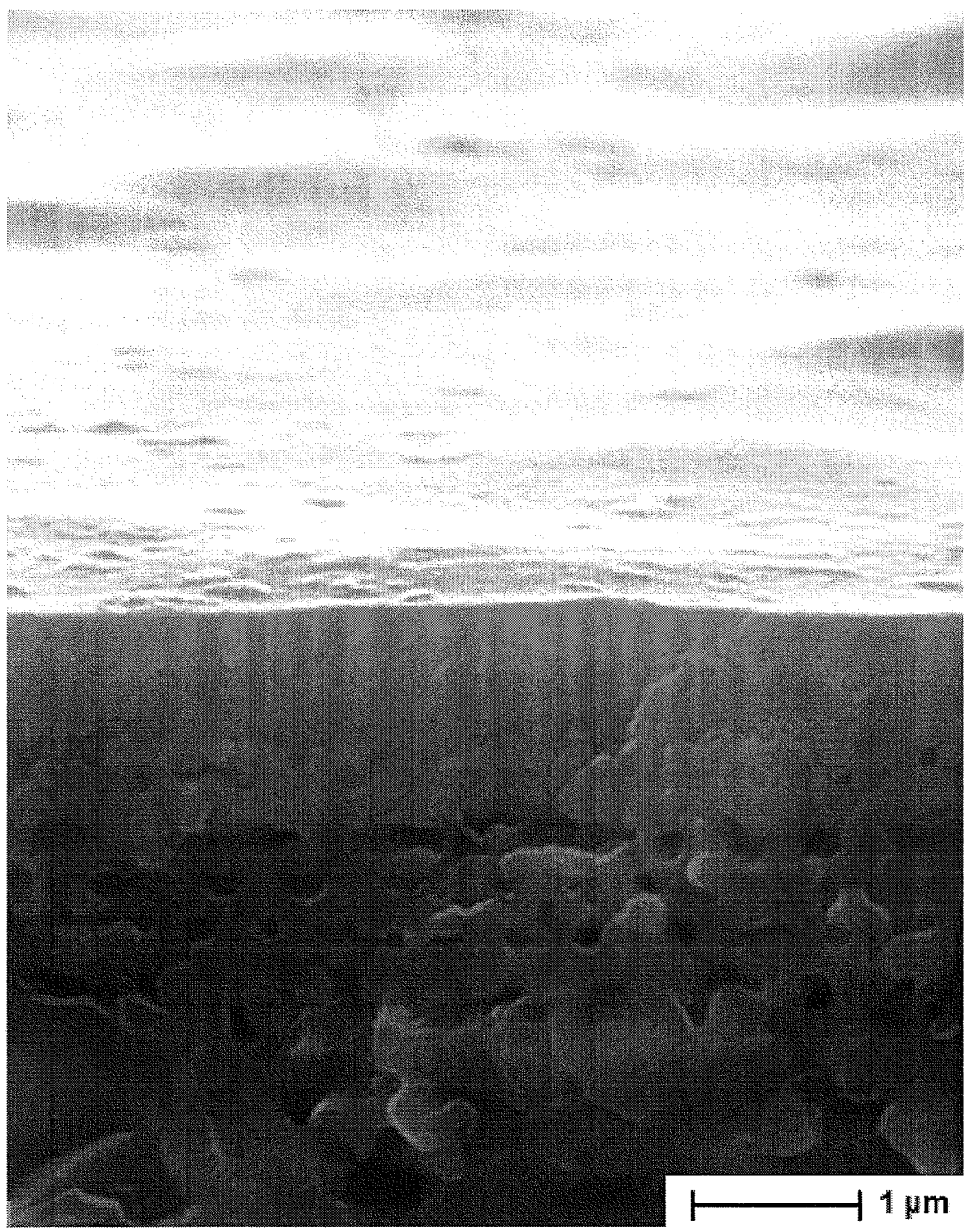

FIGS. 3A and 3B respectively show SEM photographs of the surface and a section of the YSZ thin film obtained in Example 1. As shown in FIGS. 3A and 3B, the YSZ thin film exhibits good uniformity and a density of nearly 100% which is devoid of crack or pinholes.

Figure 4:
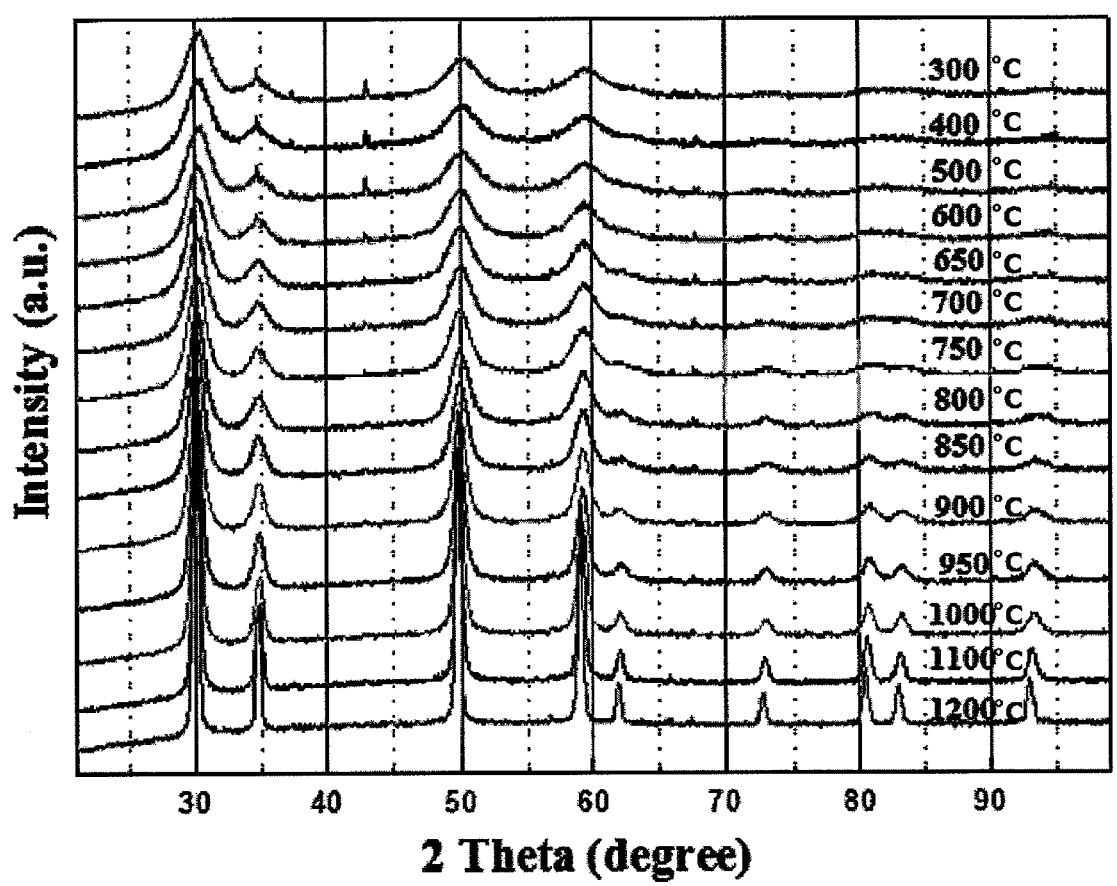
FIG. 4: X-ray diffraction (XRD) patterns of the YSZ powders obtained by heat-treatment of the metal oxide salt solution at various temperatures.
Figure 5:
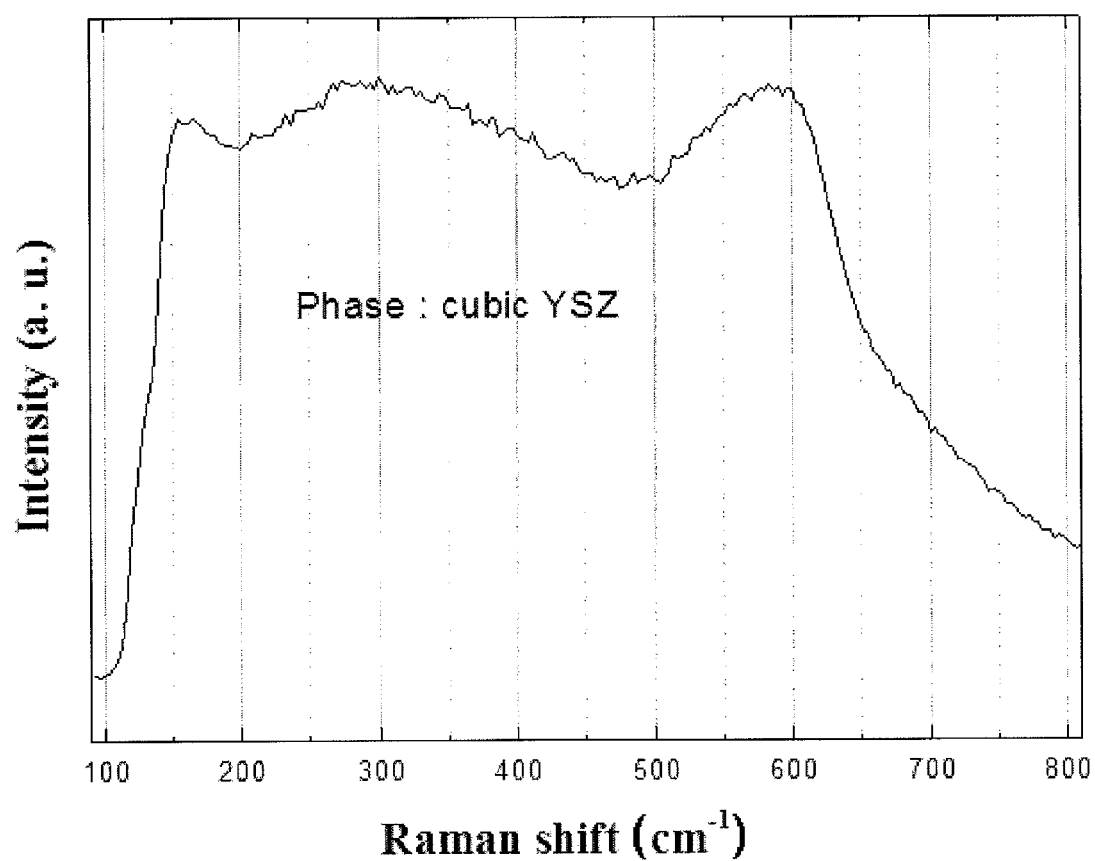
FIG. 5: a Raman spectrum of the YSZ powders obtained by heat-treatment of the metal oxide salt solution at 800° C.

FIG. 4 shows XRD patterns of the YSZ powders obtained by heat-treatment of the metal oxide salt solution at various temperatures. It can be seen from FIG. 4 that the major peaks of YSZ appear in a wide temperature range of 300 to 1200° C., which means phase formation occurs. FIG. 5 shows a Raman spectrum of the YSZ powders obtained by heat-treatment of the metal oxide salt solution at 800° C. It can be seen from FIG. 5 that a cubic phase appears, which is stable even at a low temperature of 800° C.

Example 2

Preparation of YSZ Thin Film Structure (2)

2-1. Preparation of YSZ Powder Dispersed Sols 3.3 g of yttrium nitrate hexahydrate ($Y(NO_3)_3 \cdot 6H_2O$) and 20.49 g of zirconyl (IV) chloride octahydrate ($ZrOCl_2 \cdot 8H_2O$) were dissolved in a mixed solvent in which diethyleneglycol monobutyl ether, ethanol and water were mixed at a volume ratio of 40:40:20(%), and then 20 wt % of acetyl acetone as a chelating agent was added thereto, so as to obtain a first salt solution.

1 wt % of YSZ nanopowder (particle size: 20-30 nm, specific surface area: 160 $m^2/g$, available from fuelcellmaterials.com) was dispersed in a mixed solvent in which diethyleneglycol monobutyl ether, ethanol and water were mixed at a volume ratio of 40:40:20(%), and irradiated with ultrasonic waves (60% power) to obtain a second salt solution.

The first and the second salt solutions were mixed at a volume ratio of 50:50 to obtain a YSZ powder dispersed sol.

2-2. Preparation of YSZ Thin Film Structure

The YSZ powder dispersed sol obtained in the step 2-1 was deposited on a porous NiO—YSZ substrate prepared in the same manner as in Example 1, by using the electrostatic discharge (ESD) in conditions of a substrate temperature of 340° C., a voltage of 14 kV, a distance between a substrate and a needle of 10 cm and a flow rate of 0.5 mL/h, for 40 min.

The resulting substrate was sintered at 900° C. for 4 hours to obtain a YSZ thin film having a thickness of 0.4 μm formed on the NiO—YSZ substrate.

Figure 6A:
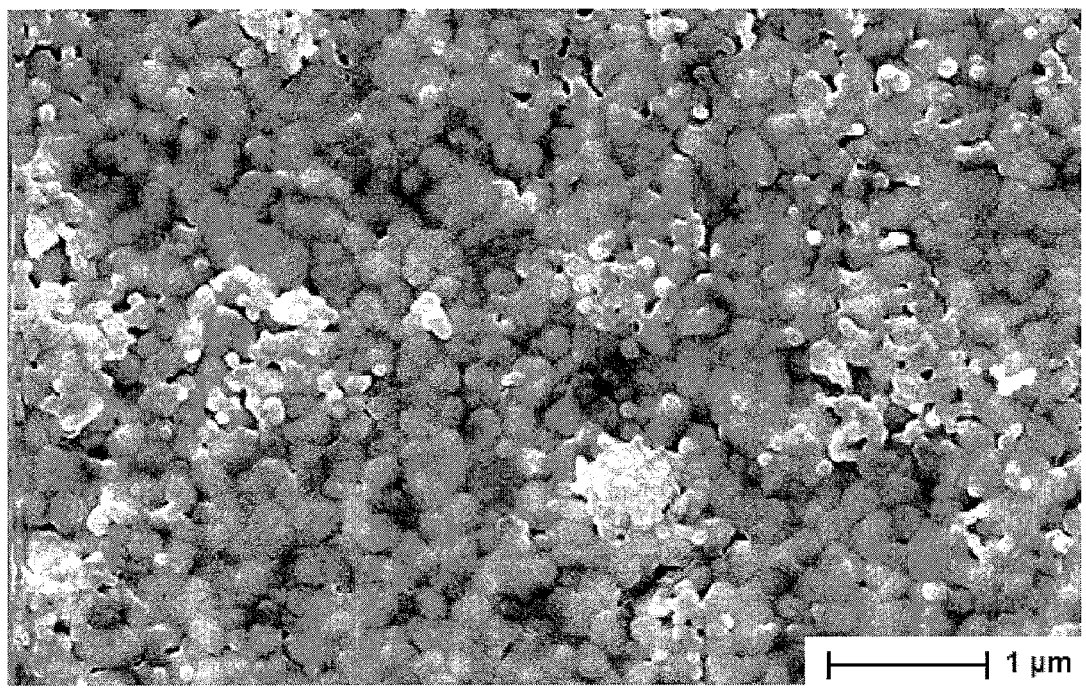
FIGS. 6A and 6B: SEM photographs of the surface and a section regarding of the YSZ thin film obtained in Example 2.
Figure 6B:
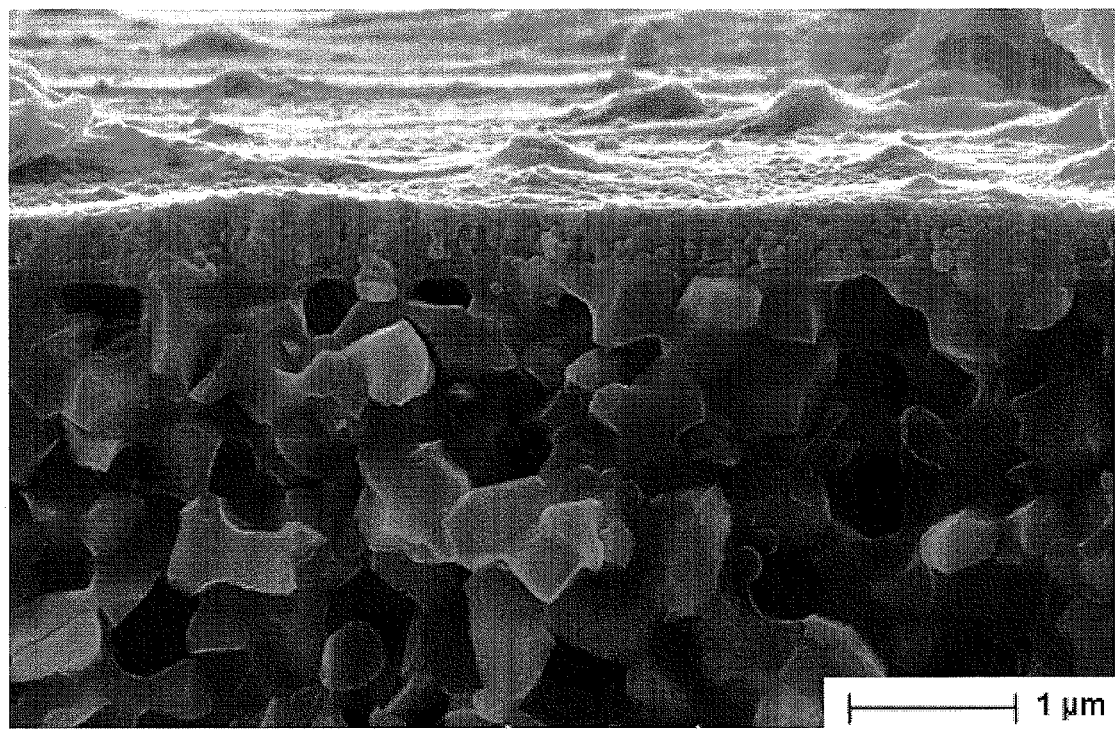

FIGS. 6A and 6B respectively show SEM photographs of the surface and a section of the YSZ thin film obtained in Example 2. It can be seen from FIGS. 6A and 6B that the YSZ thin film exhibits good uniformity and a density of about 94% which is devoid of crack or pinholes.

Example 3

Preparation of SOFC Unit Cell 3-1. Preparation of YSZ Thin Film Structures

A first structure, in which a YSZ thin film having a thickness of 1 μm is formed on the substrate, was prepared in the same manner as in Example 1, with exception that the spin-coating was conducted as following steps:

i) spin-coating once with the 10 wt % YSZ powder dispersed sol;

ii) spin-coating once with the 5 wt % YSZ powder dispersed sol;

iii) spin-coating twice with the YSZ salt solution (2 mol/L); and iv) spin-coating twice with the YSZ salt solution (1 mol/L).

In the first structure, the thickness of the YSZ salt solution layer formed in steps iii) and iv) was in a range of 50 to 400 nm.

Further, a second structure, in which a YSZ thin film having a thickness of 0.5 μm is formed on the substrate, was prepared in the same manner as in Example 1, with exception that the spin-coating was conducted as following steps:

i) spin-coating once with the 5 wt % YSZ powder dispersed sol;

ii) spin-coating once with the 2.5 wt % YSZ powder dispersed sol;

iii) spin-coating twice with the YSZ salt solution (2 mol/L); and iv) spin-coating twice with the YSZ salt solution (1 mol/L).

In the second structure, the thickness of the YSZ salt solution layer formed in steps iii) and iv) was in a range of 70 to 150 nm.

3-2. Preparation of SOFC Unit Cell

The each of the first and second YSZ thin film structures was cut at a size of 2×2 cm and then provided as a electrolyte-cathode composite.

SSC powder (SEIMI Chemical Co.) having a particle size of 2 to 3 μm was milled at room temperature for about 6 hours to obtain slurry. The slurry was screen-printed at a pattern of 1×1 on the each electrolyte-cathode composite, and then sintered at 800° C. to manufacture a SOFC unit cell including a cathode, an electrolyte and an anode. Although a general sintering temperature of SSC anode is 1000° C. or more, the electrolyte-cathode composite was sintered at 800° C. because the final sintering temperature of the electrolyte is 800° C.

Figure 7A:
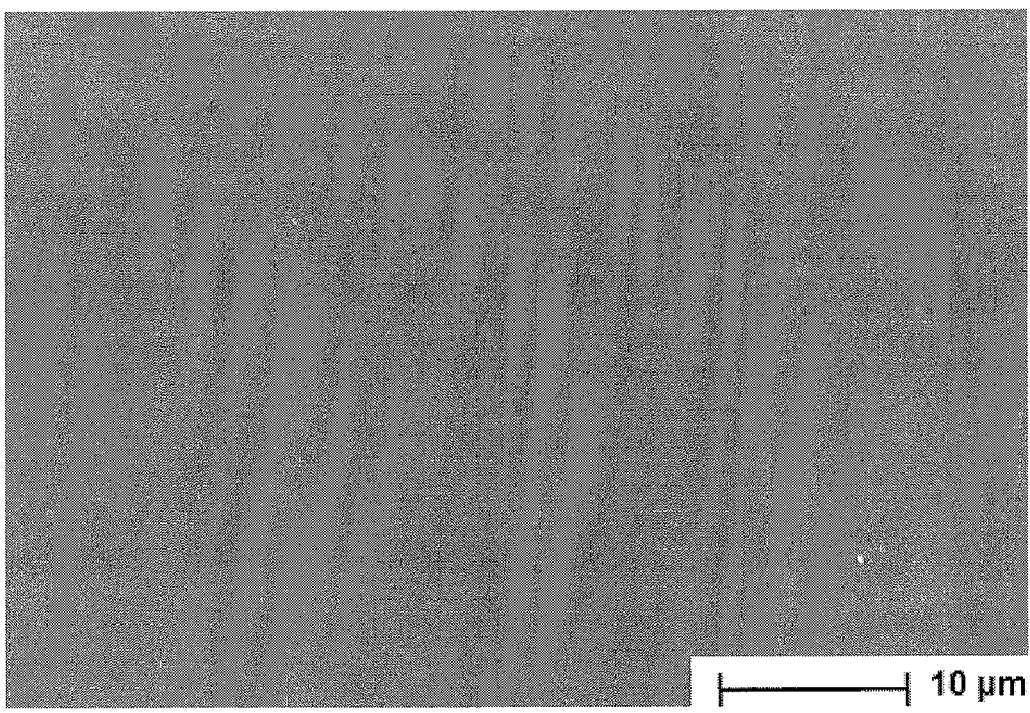
FIGS. 7A and 7B: SEM photographs of the surface and a cross section respectively of the YSZ thin film having a thickness of 0.5 μm prepared in Example 3.
Figure 7A:
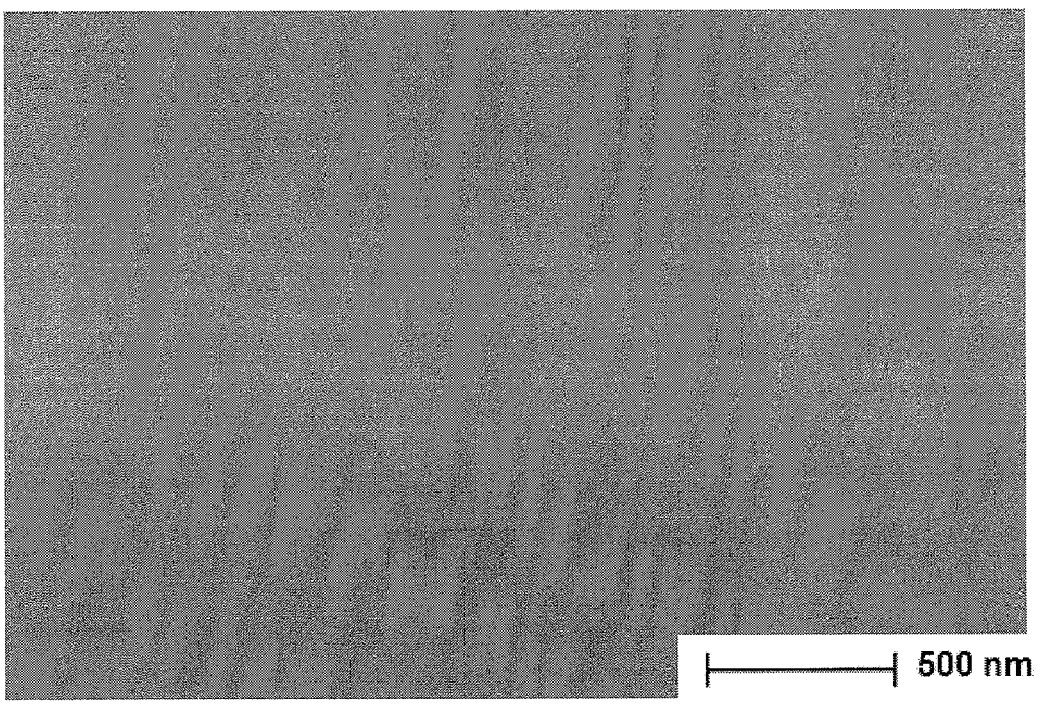
Figure 7B:
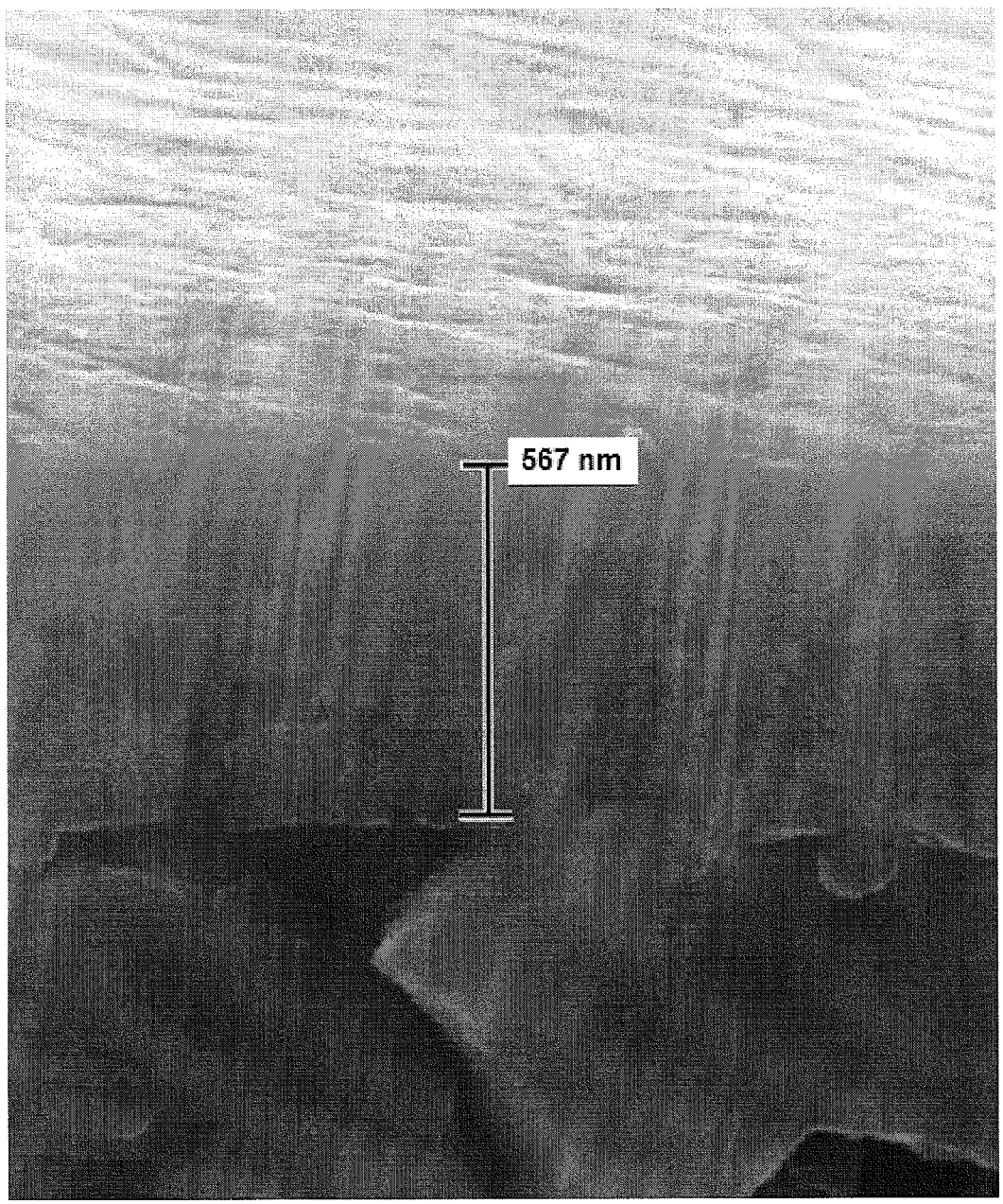

FIGS. 7A and 7B respectively show SEM photographs of the surface and section of the YSZ thin film having a thickness of 0.5 μm obtained in Example 3. It can be seen from FIGS. 7A and 7B that the YSZ thin film exhibits good uniformity and a density of nearly 100% which is devoid of crack or pinholes.

Experimental Example 1

Gas Permeability

The YSZ thin film having a thickness of 1 μm prepared in Example 3 and a NiO—YSZ substrate as a comparative example were subjected to measuring a gas permeability using a porosimeter (Porous Materials Inc., U.S.A.) in the air (see *Journal of Powder Sources*, 140: 226-234 (2005).)

Figure 8:
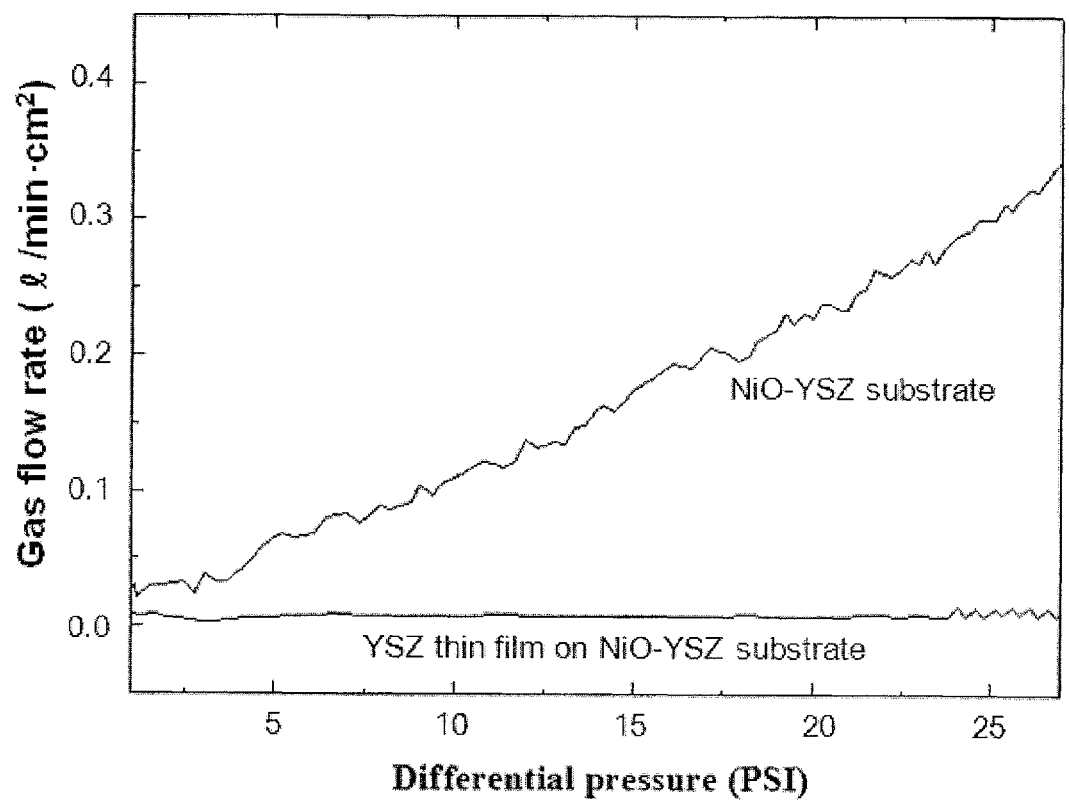
FIG. 8: the gas permeabilities of the YSZ thin film having a thickness of 1 μm prepared in Example 3 and the NiO—YSZ substrate of the comparative example.

As a result, it was found that the YSZ thin film prepared in Example 3 did not occur gas permeation at all (see FIG. 8.) Therefore, it can be seen that the inventive YSZ thin film has excellent gas-tightness.

Experimental Example 2

Structural Stability

Figure 9A:
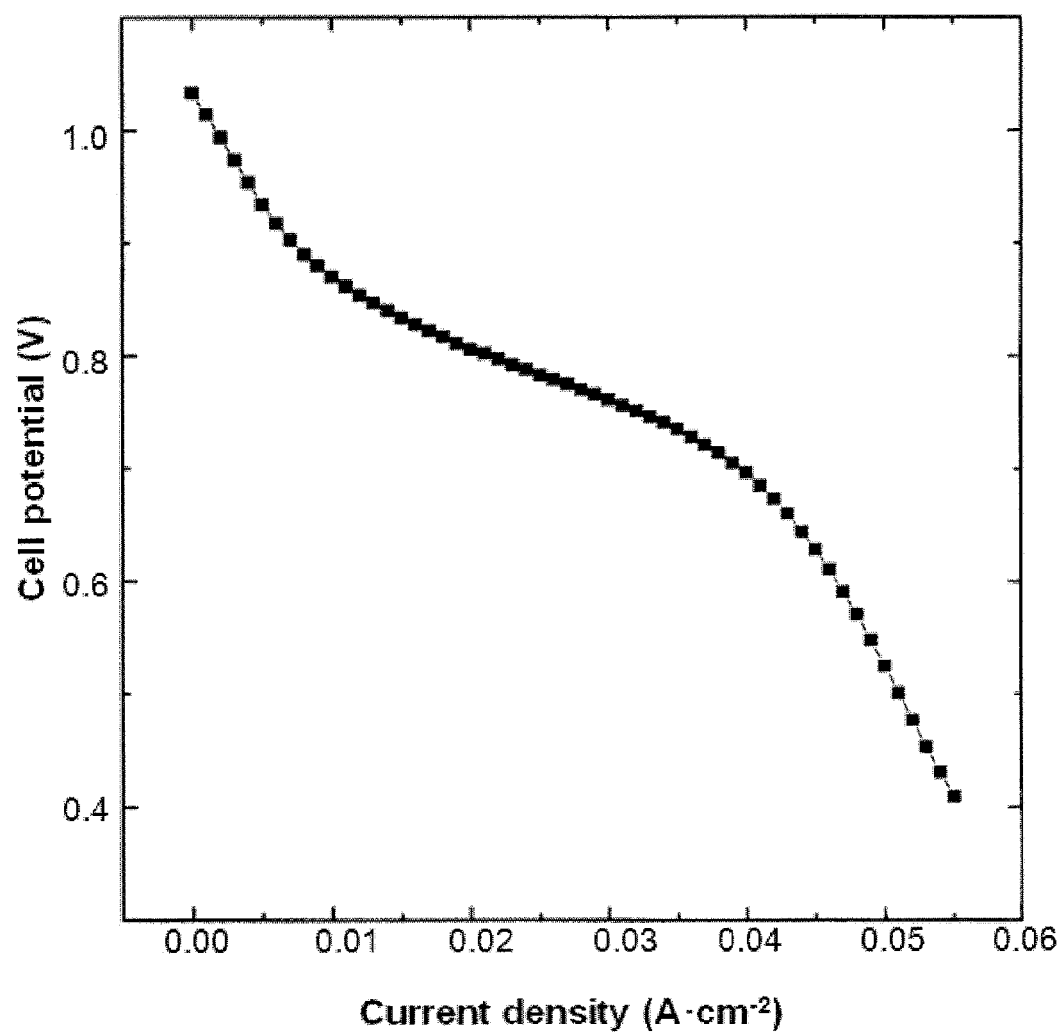
FIGS. 9A and 9B: cell properties of SOFCs comprising the YSZ thin films prepared in Example 3 having thicknesses of 1 μm and 0.5 μm, respectively.

The SOFC unit cell including the YSZ thin film having thickness of 1 μm prepared in Example 3, was subjected to measuring the open circuit voltage (OCV) at 750° C. and the result are shown in FIG. 9A. Moreover, the SOFC unit cell including the YSZ thin film having thickness of 0.5 μm prepared in Example 3, was subjected to measuring the OCV at 650° C. and the result are shown in FIG. 9B.

Figure 9B:
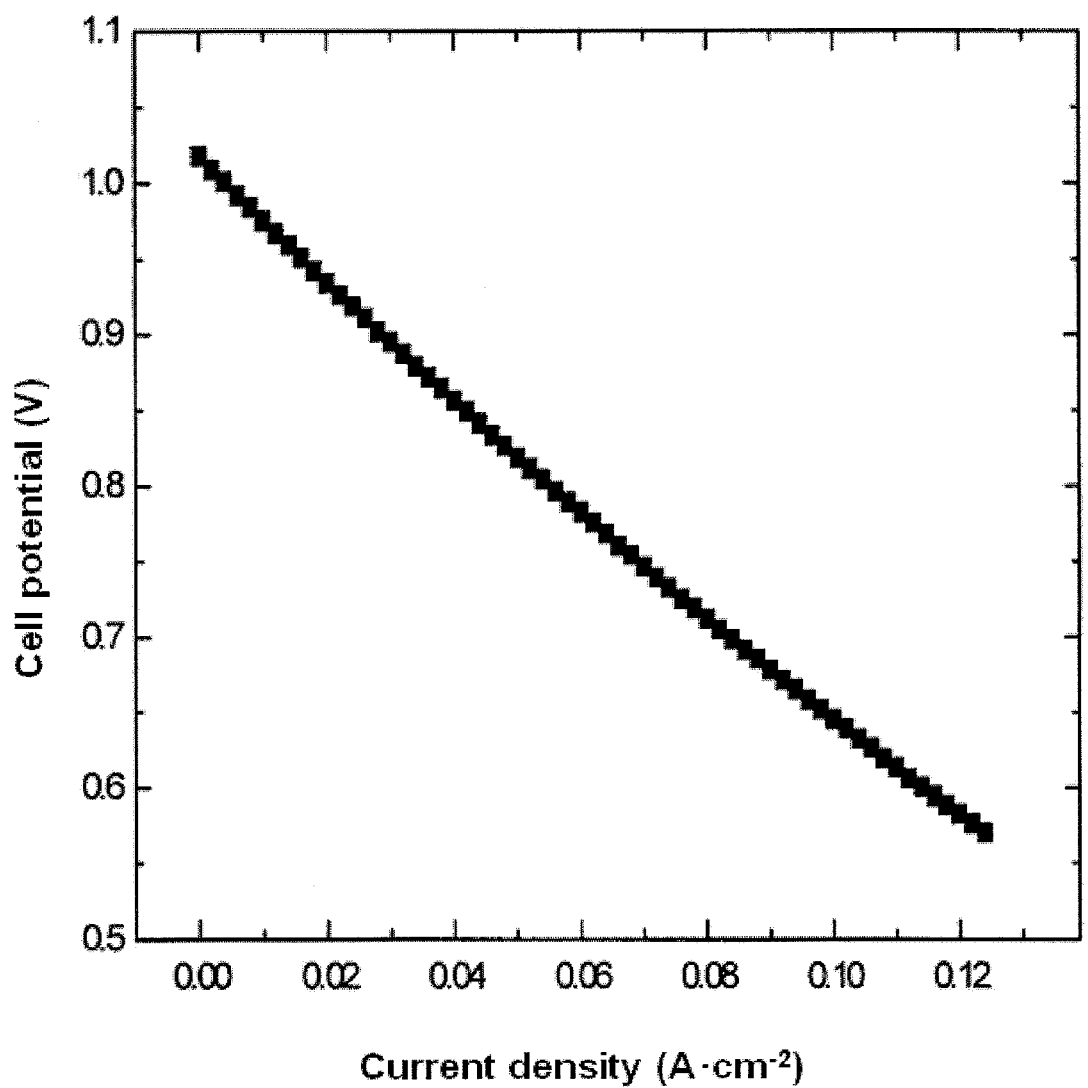

It can be seen from FIGS. 9A and 9B that the OCVs of the YSZ thin films having a thicknesses of 1 μm and 0.5 μm were 1.08 V and 1.03 V, respectively, and the inventive YSZ thin film stably operated as an electrolyte of a SOFC.

While the invention has been described with respect to the above specific embodiments, it should be recognized that various modifications and changes may be made to the invention by those skilled in the art which also fall within the scope of the invention as defined by the appended claims.

What is claimed is:

1. A method for manufacturing a metal oxide thin film structure, comprising the steps of:
   (1) preparing a metal oxide salt solution containing a first metal oxide selected from the group consisting of zirconium oxide, cerium oxide, lanthanum gallate, barium cerate, barium zirconate, bismuth oxide, and doped forms thereof;
   (2) dispersing a nanopowder of a second metal oxide selected from the group consisting of zirconium oxide, cerium oxide, lanthanum gallate, barium cerate, barium zirconate, bismuth oxide, and doped forms thereof, into a portion of the metal oxide salt solution, to prepare a metal oxide powder dispersed sol;
   (3) coating a porous substrate with the metal oxide powder dispersed sol;
   (4) coating the resulting substrate with the metal oxide salt solution prepared in step (1); and
   (5) sintering the resulting substrate to prepare a metal oxide thin film structure, wherein two or more metal oxide powder dispersed sols having different contents are prepared in step (2); and the porous substrate employed in step (3) is coated therewith at different degrees, and wherein the amount of the nanopowder of second metal oxide is at most 20 wt % based on the total weight of the metal oxide powder dispersed sol.

2. The method of claim 1, wherein two or more metal oxide salt solutions having different concentrations of the first metal oxide are prepared in step (1); and, in step (4), the substrate is coated with each of the metal oxide salt solutions at different degrees.

3. The method of claim 1, wherein the first and second metal oxide are each selected from the group consisting of samaria-doped ceria (SDC), oxides comprise samaria-doped ceria (SDC) gadolia-doped ceria (GDC), yttria-stabilized zirconia (YSZ), scandia-stabilized zirconia (ScSZ), strontium manganese-doped lanthanum galate (LSGM) and silver yttria-doped bismuth oxide (YDB).

4. The method of claim 1, wherein both the first and second metal oxides are YSZ.

5. The method of claim 1, wherein the second metal oxide nanopowder has an average particle size of 1 to 990 nm.

6. The method of claim 1, wherein the second metal oxide nanopowder is dispersed in the metal oxide salt solution in an amount of 1 to 50 wt % based on the total weight of the metal oxide powder dispersed sol.

7. The method of claim 1, wherein the coatings in steps (3) and (4) are conducted by a method selected from the group consisting of spin coating, dipping, spray pyrolysis, electrostatic spray deposition (ESD) and a combination thereof.

8. The method of claim 1, wherein step (3) or (4) is repeated more than once.

9. The method of claim 1, wherein the metal oxide thin film structure has a metal oxide thin film having a thickness of 0.1 to 30 μm formed on the porous substrate.

10. The method of claim 1, wherein the sintering temperature in step (5) is 600° C. or higher.

11. The method of claim 1, wherein the porous substrate is selected from the group consisting of a porous metal-ceramic composite, a porous ceramic insulator, a porous metal composite, a porous silicon composite, and a porous alumina.

12. A metal oxide thin film structure manufactured by the method according to any one of claims 1 and 2 to 11.

13. A solid oxide fuel cell comprising the metal oxide thin film structure of claim claim 12.

* * * * *